United States Patent
Weber

(10) Patent No.: US 7,080,190 B2
(45) Date of Patent: Jul. 18, 2006

(54) APPARATUS AND METHOD FOR PROVIDING TRANSPARENT SHARING OF CHANNEL RESOURCES BY MULTIPLE HOST MACHINES

(75) Inventor: Bret S. Weber, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 391 days.

(21) Appl. No.: 10/158,477

(22) Filed: May 30, 2002

(65) Prior Publication Data
US 2003/0225724 A1    Dec. 4, 2003

(51) Int. Cl.
G06F 13/00    (2006.01)
(52) U.S. Cl. .............. 710/315; 710/316; 710/105; 710/11; 710/38; 710/51; 710/57; 711/114; 711/148
(58) Field of Classification Search ................ 710/315, 710/316, 11–14, 51–57, 305–309, 313–317, 710/105–107, 21–28, 36–38; 711/114–118, 711/148–154, 170
See application file for complete search history.

(56) References Cited

U.S. PATENT DOCUMENTS

| | | | | |
|---|---|---|---|---|
| 5,915,102 A * | 6/1999 | Chin | ........................... | 710/113 |
| 6,275,874 B1 * | 8/2001 | Wilson | ........................... | 710/8 |
| 6,311,222 B1 * | 10/2001 | Crump et al. | ........................... | 709/246 |
| 6,640,278 B1 * | 10/2003 | Nolan et al. | ........................... | 711/6 |
| 6,708,232 B1 * | 3/2004 | Obara | ........................... | 710/11 |
| 6,724,747 B1 * | 4/2004 | Arango et al. | ........................... | 370/352 |
| 6,763,402 B1 * | 7/2004 | Talati | ........................... | 710/36 |
| 6,779,083 B1 * | 8/2004 | Ito et al. | ........................... | 711/114 |
| 6,789,152 B1 * | 9/2004 | Hoese et al. | ........................... | 710/305 |
| 2002/0194304 A1 * | 12/2002 | Cramer et al. | ........................... | 709/218 |

* cited by examiner

Primary Examiner—Christopher Shin
(74) Attorney, Agent, or Firm—Suiter West Swantz PC LLO

(57) ABSTRACT

The present invention is directed to a method and system for providing, a host input/output (I/O) module, a controller and application specific integrated circuit (ASIC) for utilization in transparent switched fabric data storage transport. The system implements I/O modules capable of translating between communication protocols for providing common message passing multi-channel data transport for data storage while providing apparent I/O circuit exclusivity to controllers. Implementing the system of the present invention allows for a common data transport system permitting component scalability and virtualization.

32 Claims, 6 Drawing Sheets

APPARATUS AND METHOD FOR PROVIDING TRANSPARENT SHARING OF CHANNEL RESOURCES BY MULTIPLE HOST MACHINES

FIELD OF THE INVENTION

The present invention generally relates to the field of data storage and particularly to a system for providing transparent switched fabric data transport to a storage area network.

BACKGROUND OF THE INVENTION

Data storage networks, present many architectural challenges and have several key requirements such as compatible data communication, and scalability. Lack of compatibility between data formats, operating systems, network protocols, storage protocols and the like, limit or preclude free transport of data across storage systems on a network. Further, in a storage network environment communicating storage system components require exclusivity to prevent miscommunication and data loss. Storage networks may also be confronted with the addition of components, such as additional storage arrays and information handling systems which may interrupt the transport of data throughout the network. Previous data storage systems fail and thus do not meet user demands.

Often, communication between varied components is a problem in data storage systems. Components may utilize different operating systems and communication protocols, thus hampering the ability to provide an integrated storage environment. For example, a server communicating via a first protocol may fail to communicate with a data storage array utilizing a second protocol. Presently when connecting multiple data storage systems, inefficient store and forward communication techniques are utilized. Interface integrated circuits, designed only to recognize a single input/output (I/O) protocol, present discovery and communication difficulties in switched fabric networks when multiple host devices are capable of accessing the I/O integrated circuit, such as is associated with a storage array. Thus, current data storage networks fail to provide effective communication for data storage systems.

A monolithic data storage system, a system implemented as a whole, provides a single protocol environment but is undesirable due to cost concerns and limitations in scalability. Further, a single protocol system is inherently limited by the choice of transport protocol. When implementing monolithic systems, users often discard existing components due to incompatibility. Therefore, monolithic data storage systems fail to provide scalable, heterogeneous communication protocol capable data storage.

Scalability is another key concern in data storage architecture. Users of data storage systems want storage systems capable of adding components without resorting to improvised fixes. In essence, current data storage systems lack a building block ability to adapt. The scalability of a data system may also be limited due to communication protocols ill designed for particular components. Scalability may also be limited by the overall size of the data storage system itself. Consequently, data storage systems do not provide an efficient and reliable means to scale components.

Therefore, it would be desirable to provide a system for implementing common message passing data transport in a switched fabric data storage communication system.

SUMMARY OF THE INVENTION

Accordingly, the present invention is directed to a method, a system, an I/O module, a controller element and application specific integrated circuit (ASIC) capable of providing transparent common message passing data storage transport.

The system implements I/O modules and controller elements with circuits capable of translating between communication protocols for providing transparent multi-channel data transport for mirrored data storage. Implementation of the system of the present invention allows for a common data transport system and method permitting component scalability and virtualization.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
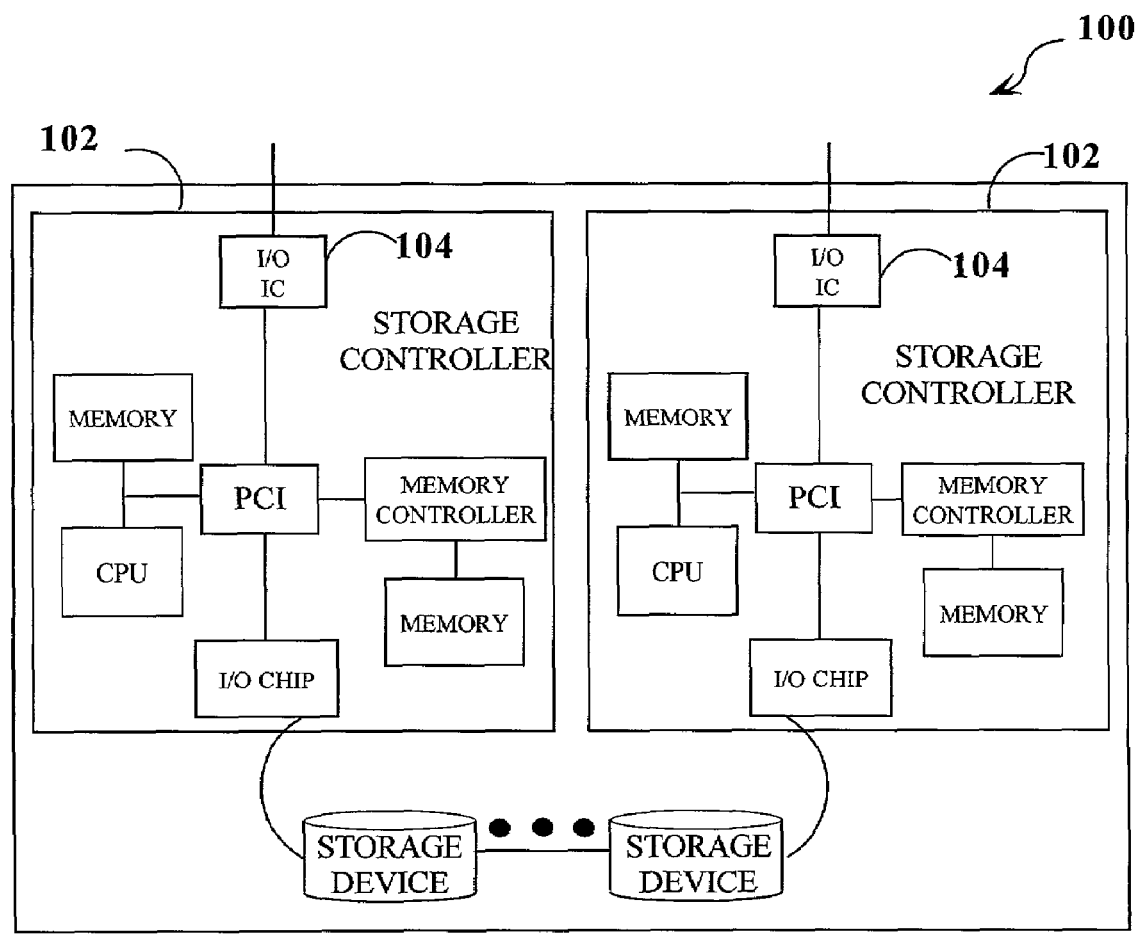
FIG. 1 is an illustration of a prior art storage system including storage controllers is shown.

Referring to FIG. 1 a prior art storage system 100 is shown. The storage system 100 includes storage controllers 102. Included in each storage controller is an I/O integrated circuit 104 for interfacing with host devices. One of the drawbacks to current storage system are that the I/O integrated circuits in utilization are limited to a particular communication protocol. In current systems, in order to access a particular logical unit number within such a storage system a host device has to utilize a protocol compatible with that particular I/O integrated circuit. Further, as multiple storage systems 100 are used together, each I/O circuit 104 only has access to storage devices contained in that single storage system 100. The I/O circuit for one system 100 cannot access the storage devices of a separate storage system 100.

Figure 2:
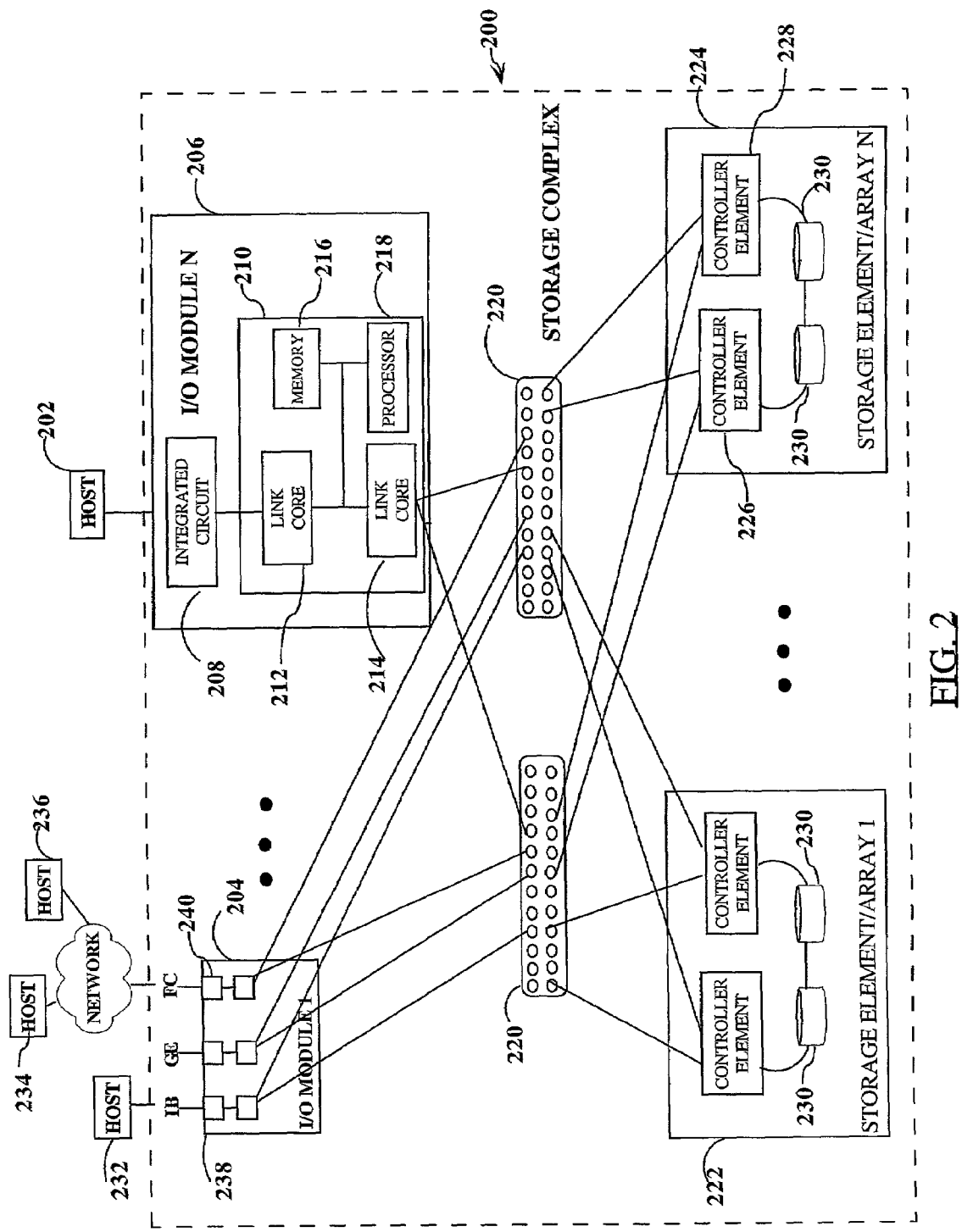
FIG. 2 is an illustration of an embodiment wherein a storage complex for transparent common message passing data storage transport is shown.

Referring to FIG. 2 an embodiment of the present invention wherein a storage complex system 200 for common message passing data transport is shown. The present invention allows for transparent mapped data transport over an internal switched fabric link, thus providing scalability and common message passing while providing apparent exclusivity for controllers.

Included in the system 200 are I/O modules. In the current embodiment I/O modules 1 204 through "N" 206 are shown. It is to be understood that the storage complex of the present invention is scalable with respect to storage complex components. The present invention further allows for scalability with respect to host devices and or host device networks. I/O modules included in the storage complex system 200 may be coupled either directly or via a network to a host device or a plurality of host devices depending on the implementation. Host devices 202 include servers, information handling systems and the like.

A host interface I/O circuit is included in the I/O module. I/O circuits are suitable for data transport with a host device or multiple host devices utilizing a common protocol over the physical connection. Suitable protocols include SCSI Remote DMA Protocol (SRP) over InfiniBand (IB), Small Computer System Interface over TCP/IP (iSCSI) over Ethernet, Fibre Channel Protocol (FCP) over Fibre Channel (FC), and the like. For example, I/O circuit 208 implements FCP over FC for communication with a host device 202. In a second example, an I/O circuit 238 utilizing SRP over IB communicates with a host device 232. In a third example an I/O circuit 240 communicates via a FC Fabric with host devices 234 and 236 utilizing FCP over FC. It is to be apparent that various protocols and physical connections may be implemented without departing from the scope and spirit of the present invention. Data transfers in target mode to these I/O circuits (chips) typically use a vendor unique message passing scheme that consists of a microprocessor pre-posting command buffers to the I/O chip on initialization. Command buffers specify an area in microprocessor memory where an incoming storage command from a host device are deposited by the I/O chip. The I/O chip vendor unique message passing scheme also has a mechanism to allow the one and only one microprocessor to specify a data transfer message indicating to the I/O chip where in memory to get/put the data (scatter gather list), as well as the direction of the data flow. The message passing scheme allows the one and only one microprocessor the ability to specify a completion message after the data transfer is complete that indicates that the entire I/O command has completed. It is the function of the I/O chip to convert from this I/O chip specific message passing scheme to a physical interface such as Fibre Channel, and a standard I/O storage protocol such as FCP. It is also noted that there are I/O chips which are unintelligent in which a microprocessor must discretely implement the I/O protocol by way of a specific driver.

An application specific integrated circuit (ASIC) 210 is included in the I/O module "N" 206. The ASIC 210 functions to translate generally between the vendor unique message passing protocol implemented by the I/O Chip and the common message passing protocol implemented internally in the storage complex 200. Moreover, ASICs of the present invention are capable of providing masking and funneling to interface I/O circuits. The ASIC of the present invention is suitable for emulating data transfers for the associated I/O circuit. Translation and routing may be based on host world wide name, a unique host identifier, logical unit number and the like. In embodiments of the present invention the ASIC is capable of virtualization of data storage such as striping, and logical unit number concatenation as well as virtualization of hosts, ports, LUNS and volumes. Striping includes interleaving data to multiple controller elements and concatenation includes filling a portion of data on one controller element and then moving to another controller element, such that multiple separate volumes on multiple controller elements appear to a host as a single logical unit.

At least one link core is included in the I/O module ASIC 210. Link cores are suitable for communication in compliance with InfiniBand (IB), Gigabit Ethernet (GE), Fibre Channel (FC), PCI Express, Peripheral Component Interconnect (PCI), Peripheral Component Interconnect-X (PCI-X) and the like. For example, I/O module ASIC 206 includes a first link core 212 suitable for utilization in compliance with PCI Express to communicate with the I/O circuit 208 and host 202 associated with I/O module N 206 and a second link core 214 compliant at least minimally with InfiniBand, when the storage complex utilizes InfiniBand. It will be apparent that transactions occurring over link cores of the storage complex 200 may be compliant with other protocols or some level of compliance as contemplated by one of ordinary skill in the art without departing from the spirit and scope of the present invention.

A processor 218 is coupled to the first and second link cores 212 and 214. For example in the present embodiment an ARM (Advanced RISC Machine) core type processor 218 is implemented. In additional embodiments, other processors are implemented. As will be discussed with respect to FIGS. 3A and 3B the ASIC processor implements different functionalities depending on associated I/O circuits and the like. The processor 218 is suitable for translating messages between the first and second link cores 212 and 214, wherein translation is based on at least one of host world wide name, a unique host identifier and logical unit number.

A memory 216 coupled to the processor 218 is suitable for processor code storage and execution, buffering data transports as well as storing commands such as from preposted command buffers, or command pool routing function providing a routing table. Buffering may include buffering data as well as read write commands and the like. Routing tables may include host world wide name, logical unit number (LUN), unique host identifiers, controller element identifiers for directing data transports though the storage complex 200. For example, at initialization processors from each controller element 226, 228, pre-post command buffers to each I/O module ASIC which is discovered. For example, I/O module ASIC for I/O modules 1 though "N" Each controller element processor independently discover each I/O module ASIC in the storage complex system. Routing tables that are contained in each ASIC, are then configured to determine which controller element host commands are routed to. In further implementations of the present invention commands may reside either in part or in whole on the processor such as firmware as well and it is the intention to encompass and include such changes as contemplated by one of ordinary skill in the art. Further it will be appreciated that components included in the ASIC may be implemented as independent external components such as to allow for upgrades and the like.

Two switches 220 are included in the system 200. The switches 220 are coupled to at least one link core 214 of the I/O ASIC 210. The switches 220 are suitable for communication at least minimally in compliance with InfiniBand communication protocol. The second link core 214 of the I/O module ASIC 210, coupled to each of the switches, is InfiniBand compliant and may allow tunneling PCI or PCI Express through InfiniBand for increased transparency. In further embodiments other communication protocols are implemented as contemplated by one of ordinary skill in the art. Each switch is capable of propagating data including providing mirrored data to storage elements and controlling communication.

Storage elements are individually coupled to each switch 220. Storage element one 222 through N 224 are shown. It is to be understood that the present invention is scalable with respect to storage elements.

Controller elements are included in each of the storage elements. Referring to storage element "N" 224, two controller elements 226 and 228 are included. Each storage element in the storage complex system 200 may or may not be substantially similar to storage element "N" 224. Including at least two controller elements allows for write cache enablement.

Included in each storage element are a plurality of storage devices 230. Storage devices include hard drives, tape drives, optical storage devices, magnetic-optical devices, and the like. Optical storage devices may include CD-ROM, CD-R, DVD and the like. Various combinations/arrangements of devices including various RAID configurations may be desirable and it is within the spirit and scope of the present invention to include these combinations and arrangements. For example, storage element 222 may contain storage devices suited for high I/O operations while storage element 224 may contain storage devices designed for high bandwidth. Correspondingly, pre-mapped transfers may target specific storage elements/storage devices customized for desired capabilities. In additional embodiments, storage devices may be external to the storage element, such as to facilitate upgrades and the like.

Figure 3A:
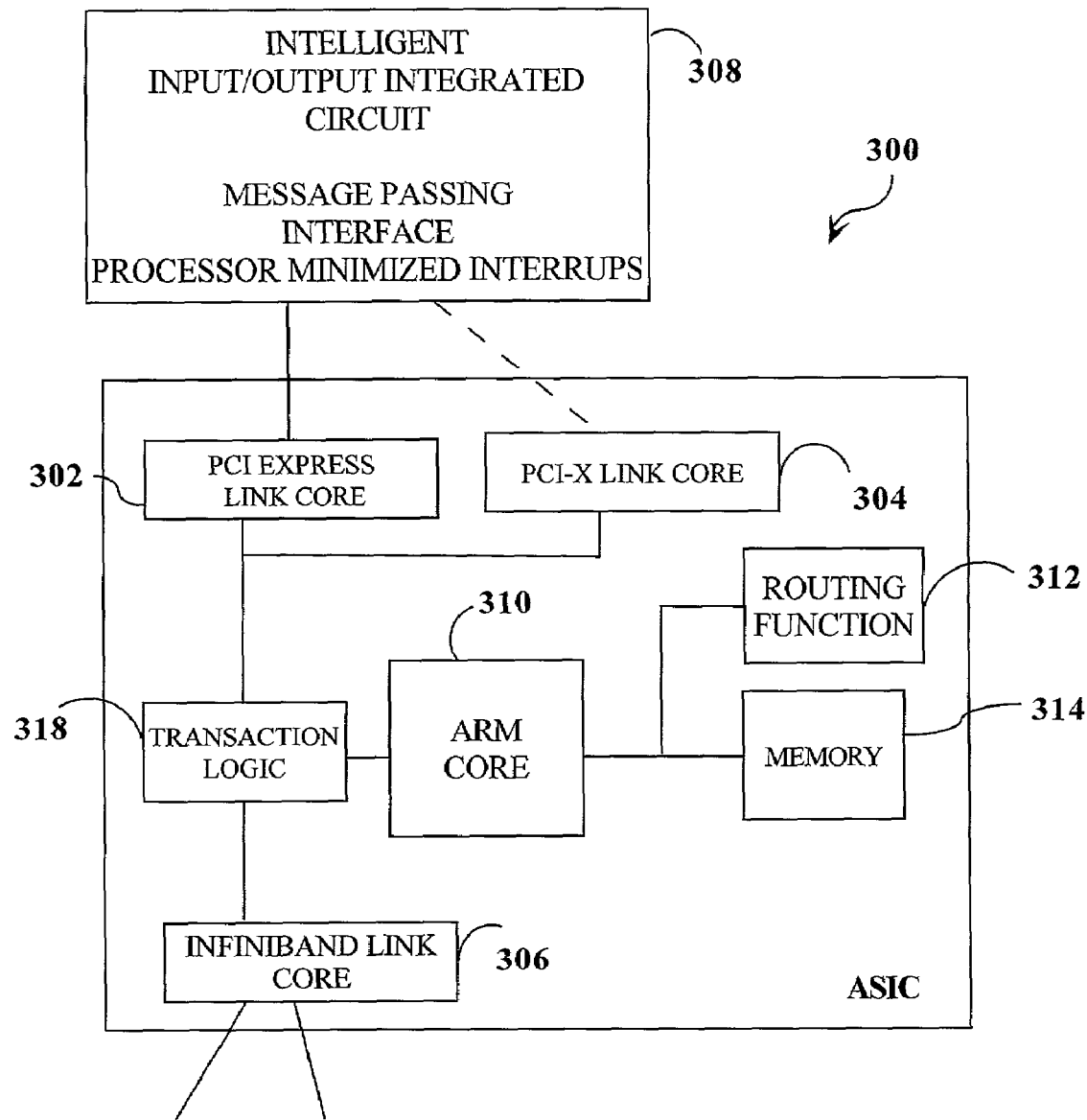
FIG. 3A is an illustration of an embodiment wherein an application specific integrated circuit for utilization in switched fabric data storage transport is configured for utilization with an intelligent integrated circuit.

Referring to FIG. 3A an embodiment of an I/O module ASIC 300 suitably configured for interfacing with an intelligent I/O circuit 308 is shown. The I/O circuit 308 is substantially the same as the I/O circuit 208 described with respect to FIG. 2. The ASIC 300 of the present embodiment interacts via a message passing interface via I/O circuit 308. The ASIC 300 of the present invention allows for translation and common message passing through a storage complex such as generally described with respect to FIG. 1. The ASIC 300 permits apparent exclusivity and transparent data transport between storage complex components, such as controller and an intelligent I/O integrated circuit 308 with internal processor minimized interrupts. Link cores may implement, a variety of standards such as InfiniBand (IB), Gigabit Ethernet (GE), Fibre Channel (FC), PCI Express, Peripheral Component Interconnect (PCI), Peripheral Component Interconnect-X (PCI-X) and the like.

The module ASIC 300 of the present embodiment utilizes a PCI Express compliant link core 302 coupled to the I/O integrated circuit 308. A transaction logic 318 is coupled to the PCI Express link core 302 and an InfiniBand link core 306 suitable for integration into an InfiniBand based storage complex providing switched fabric link substantially as described in regards to FIG. 2.

Utilization of the transaction logic 318 allows for translation between link cores, for example, PCI Express 302, PCI-X 304, and InfiniBand 306. In the present embodiment translation logic 318 may be implemented by state machines which translate bus cycles and DMA operations from one link core to the other, and can be controlled or monitored by ARM core processor 310. In further embodiments various processors capable of controlling the transition logic 318 and capable of interfacing with a memory 314 are contemplated. Routing function 312 may be included either as software, firmware, hardware or a combination thereof for implementation with the ARM core 310 processor.

The memory 314 may be capable of storing routing function software tables until requested by the ARM core 310. For example, the memory 314 may maintain pre-mapped targets for read/write commands, routing table data such as host world wide name, a unique host identifier, LUN, controller identification and the like. Further, the memory 314 may be additionally suitable for buffering data. For example, if ASIC 300 receives data from more then one controller data may be buffered to avoid miscommunication.

Figure 3B:
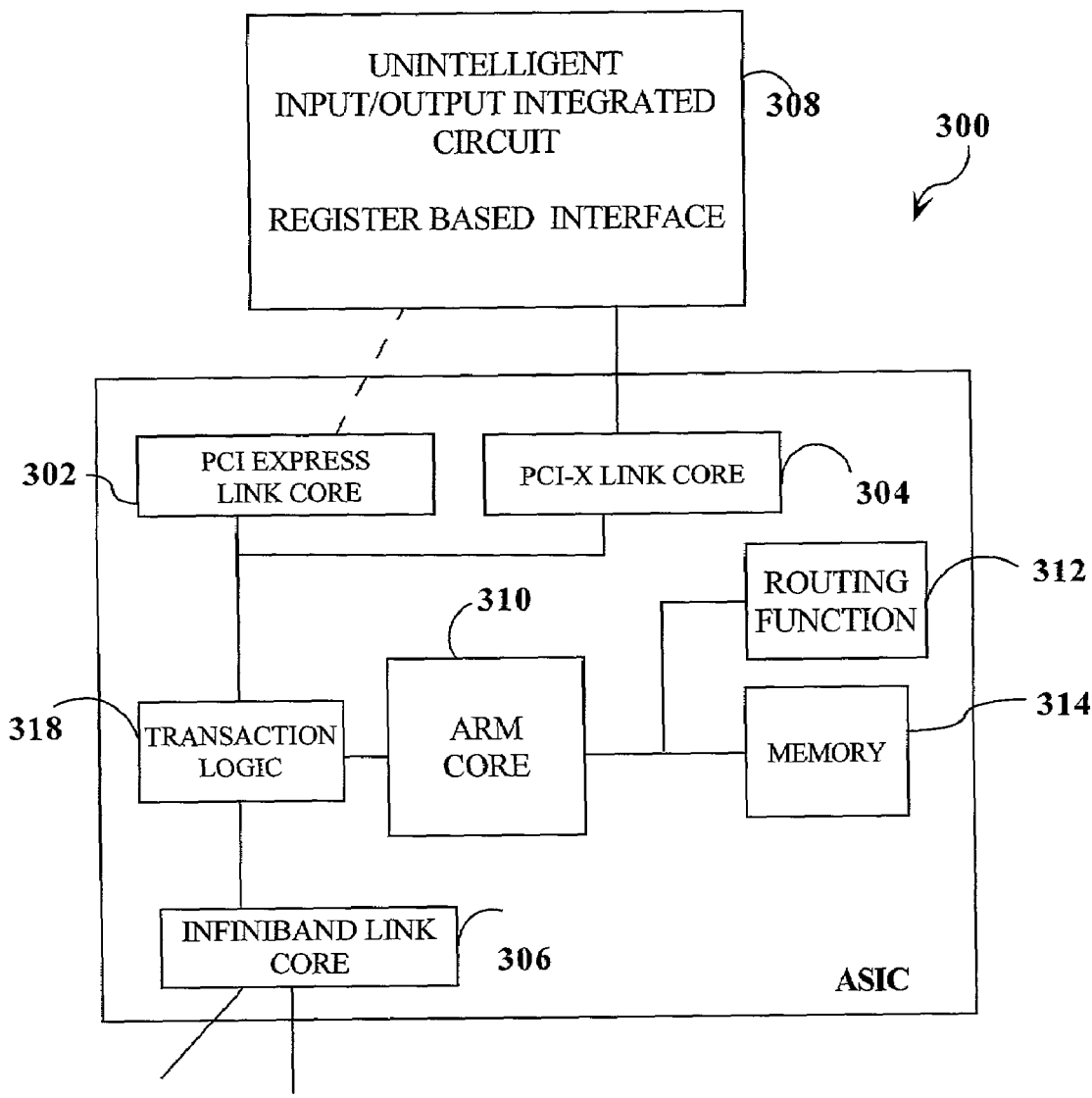
FIG. 3B is an illustration of an embodiment wherein an application specific integrated circuit for utilization in switched fabric data storage transport is configured for utilization with an unintelligent integrated circuit.

Referring to FIG. 3B, the I/O module ASIC of FIG. 3A is shown suitably configured for interfacing with an unintelligent I/O integrated circuit 318. Persons skilled in the art will appreciate that the ASIC of the present embodiment is substantially similar to the ASIC described with respect to FIGS. 2 and 3A. In the present configuration the unintelligent I/O integrated circuit 318 is coupled to the PCI-X link core 304 included in the ASIC 300. The present configuration additionally allows for use of the ASIC 300 with an unintelligent register based interface integrated circuit 318, such as Agilent Tachyon integrated circuit and the like. The ASIC 300 is capable of executing an appropriate software driver for implementing a specific storage protocol and translating between the unintelligent registers of integrated circuit 318, and the internal message passing interface of the complex. Translation and routing may be maintained based on host world wide name, a unique host identifier, logical unit number and the like. In additional embodiments the ASIC is suitable for virtualization such as striping and logical unit number concatenation as well as virtualization of ports and volumes, as discussed above.

Figure 4A:
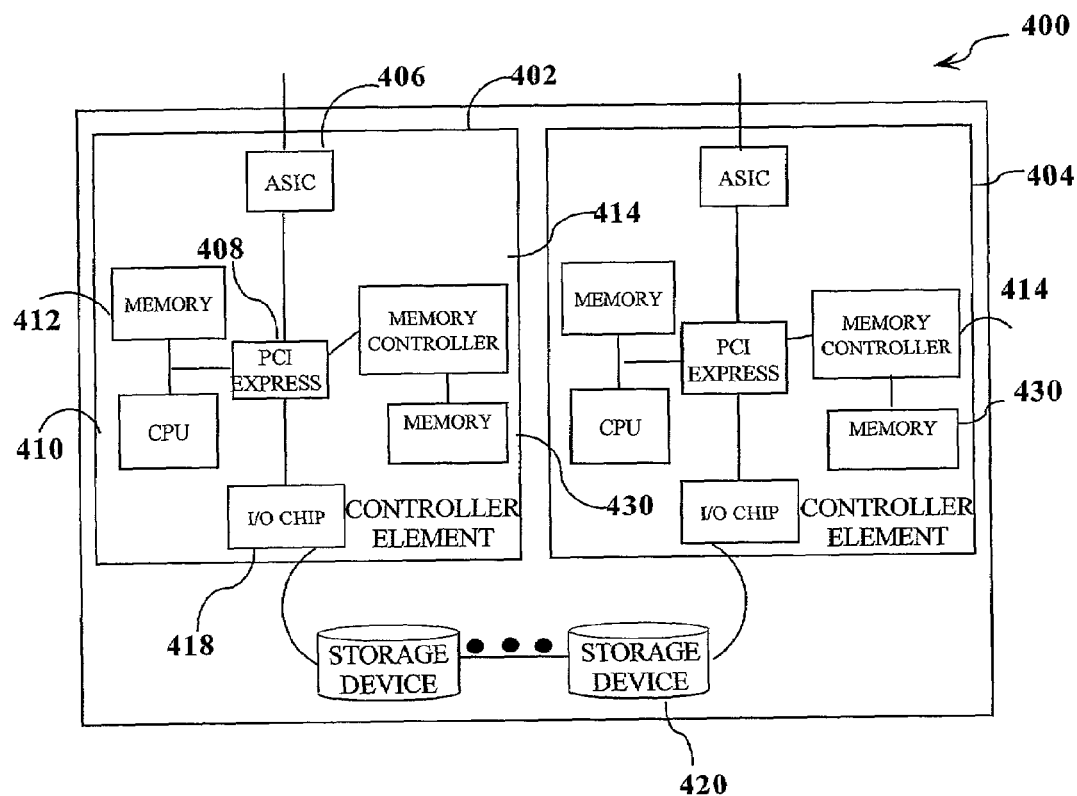
FIG. 4A is an illustration of an embodiment wherein a storage element for utilization in common message passing data storage transport includes controller elements with an interconnect compliant with Peripheral Component Interconnect Express (PCI Express)

Referring to FIG. 4A, an embodiment of a storage element including at least two controller elements per storage element 400 are shown. Two controllers 402 and 404 are shown. In the present embodiment the first controller 402 and the second controller 404 are substantially similar. In further embodiments, various combinations and arrangements of controller elements may be utilized as contemplated by one of ordinary skill in the art without departing from the scope and spirit of the present invention. The controller element includes an ASIC 406. The controller 404 may implement ASICs as are described generally with regard to the I/O module ASICs in regards to FIGS. 2, 3A and 3B respectively 210 and 300. In application in which ASIC is implemented into a controller element to function in direct memory access mode the ASIC processor may not be included.

A controller element interconnect 408 is coupled to the controller ASIC 406. The storage controller interconnect 408 is suitable for interacting with a storage I/O circuit 418 coupled to a plurality of storage devices 402. In the present implementation the interconnect is compliant with PCI Express. In further embodiments such as described with respect to FIG. 4B, an interconnect 324 is compliant with PCI and the like as contemplated by one of ordinary skill in the art.

A controller element central processing unit (CPU) 410 is coupled to the interconnect 408. The controller CPU 410 is suitable for controlling operation of the interconnect 408.

The controller CPU 410 may be capable of providing RAID engine control over the plurality of storage devices 420 configured for RAID operation via the interconnect 408 and I/O circuit.

A memory 412 is coupled to the controller CPU 410 and the interconnect 408. The memory is suitable for storing software capable of encoding instruction for operation of the storage controller CPU 410 for example, preposted buffer commands and the like.

Included in the controller element 402 may be at least one memory controller 414 and an associated memory 430. The memory controller 414 and the memory 430 are suitable for utilization in buffering data transfers and the like. For example, a RAID specific memory controller may be implemented.

Figure 4B:
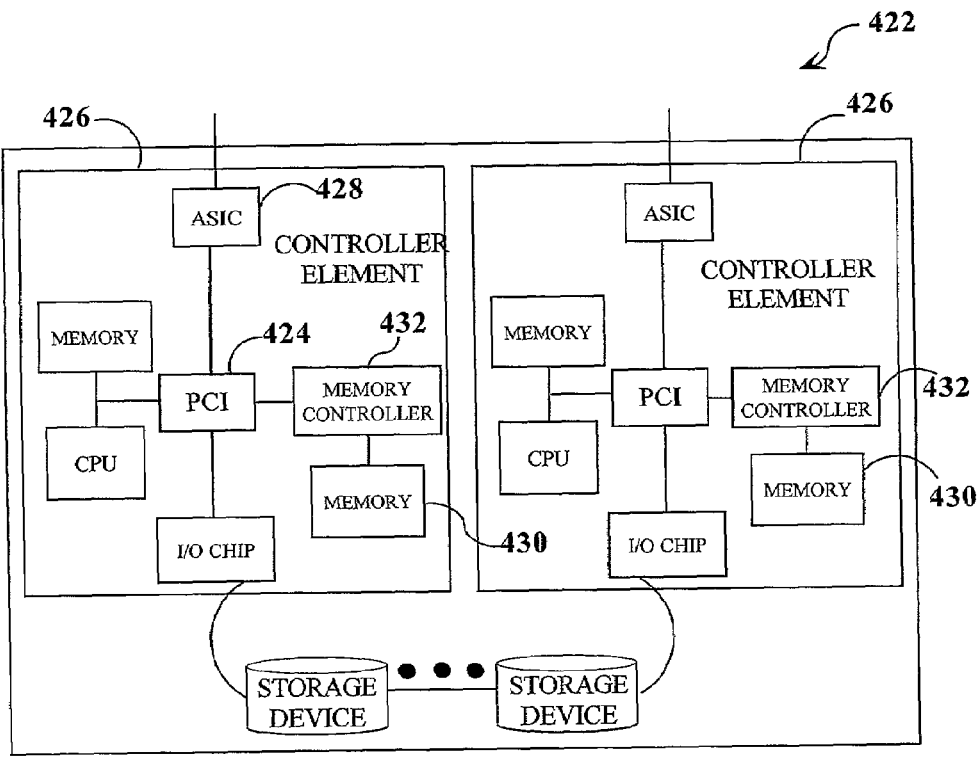
FIG. 4B is an illustration of an embodiment wherein a storage system for utilization in switched fabric data storage transport includes storage controllers with a storage controller interconnect compliant with Peripheral Component Interconnect.

Referring to FIG. 4B a storage element of the present invention 422 is shown. The storage element includes at least two controller elements 426 substantially similar to the storage element 400 as discussed with respect to FIG. 4A and to the ASICs 210 and 300 discussed with respect to FIGS. 2 and 3, respectively. The storage system 422 includes a controller element interconnect 424 compliant with PCI. In the present aspect of the invention the controller ASIC 428 is configured for interface with the PCI based interconnect 424. In further aspects the controller interconnect 424 and the ASIC 428 are compliant with other protocols as contemplated by one of ordinary skill in the art without departing from the scope and spirit of the present invention.

The controller element 426 includes a memory controller 432 such as a XOR memory controller coupled to the interconnect 424. A memory 430 is associated with the XOR controller. The XOR memory controller and the associated memory 430 are suitable of storing data, such as stored data for transport, from the PCI interconnect 424.

Figure 5:
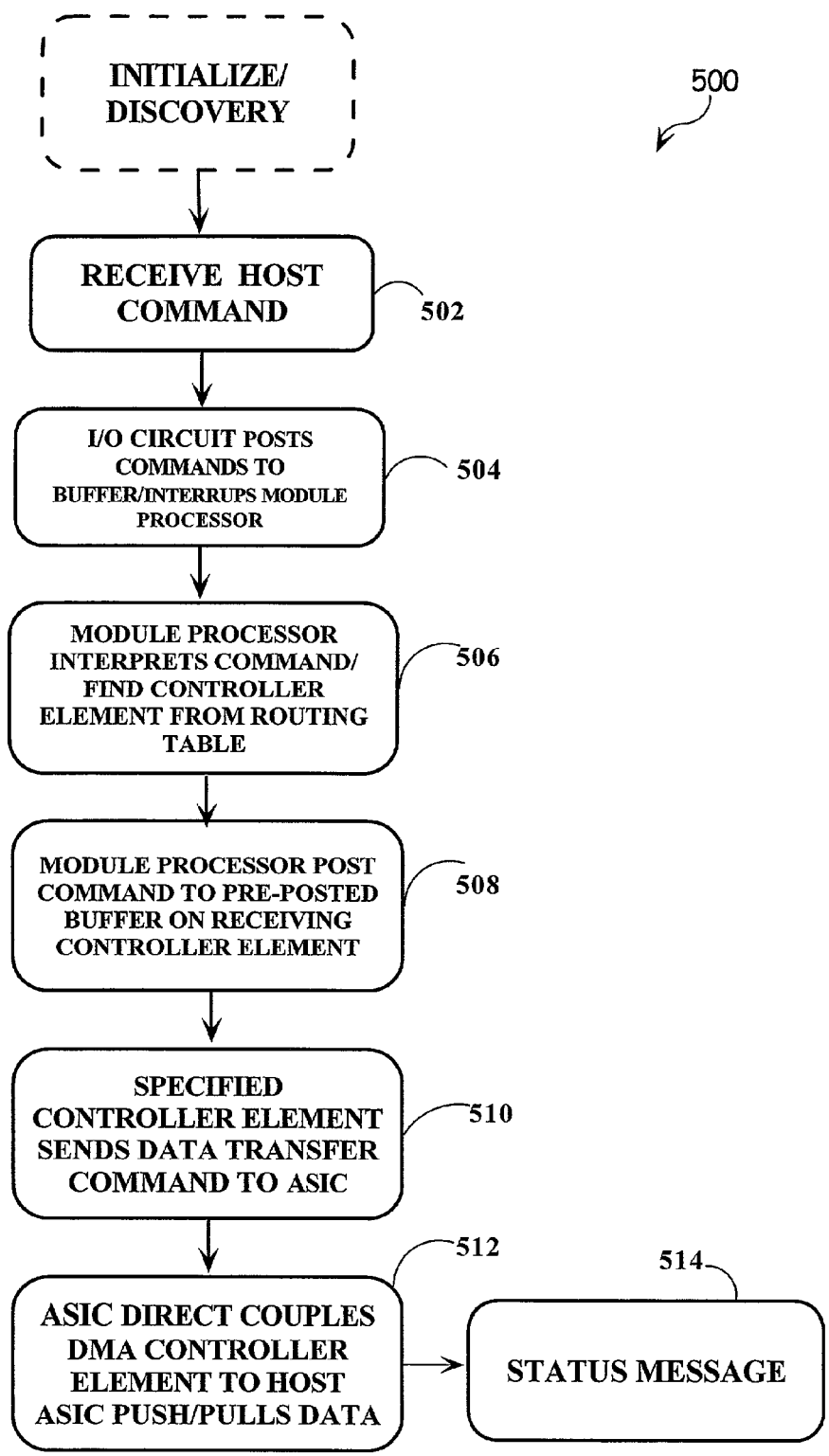
FIG. 5 is a flow diagram of a method for providing common message passing data transport.

Referring to FIG. 5, a method 500 for providing common message passing data transport is discussed. An I/O module associated with an I/O interface ASIC is connected to one or multiple host devices, either direct or via a storage area network. Initially, on power up, the controller elements discover the I/O module ASICs, and set up routing tables and pre-posted command buffers to the ASIC. The ASIC in turn, preposts command buffers to the I/O circuit. During normal operation, commands are received from the host device 502 via a I/O circuit, commands include read/write command.

Upon receiving host commands the I/O circuit direct memory accesses to the preposted buffer and interrupts the module processor 504. For example, with regard to FIG. 2, the host 202 sends a read command via I/O circuit 208 to the ASIC processor 218 and associated memory 216.

A processor implementing the present method interprets the command 506. Interpreting includes translating into a common message passing interface where translation is based on at least one of host world wide name, unique host identifier, and LUN. For example, the processor utilizing routing data determines the controller element pointed to by the host/LUN combination for the desired data and the like. In another example, when a write command is received the ASIC may implement the routing function by way of a linear search engine such as discussed generally with respect to FIGS. 3A and 3B for translation. The ASIC processor then writes the command to the appropriate controller elements pre-posted buffer area 508. The controller element is then interrupted and processes the command.

The controller element then sends a data transfer message to the I/O module ASIC by way of the common protocol 510. In the case of a read command the controller element processor obtains the data from the particular storage device. In the case of a write command data is transferred to the controller element for the particular storage device for buffering/writing.

A processor, such as the I/O module processor 218, FIG. 2 implementing the steps of the present method then posts a send data operation to the I/O interface circuit, such as I/O circuit 208 described in FIG. 2. The ASIC then transfers data from/to the host by way of directly coupled DMA 512 to/from the controller element data transfer memory, such as described generally in FIG. 4B. The I/O circuit subsequently sends either an auto reply to the host, or a reply specified by the controller element. Upon completion an I/O circuit implementing the current method interrupts the I/O Module ASIC processor, and provides an operation complete status message 514, which is then sent back to the appropriate controller element by way of a completion message. When executing a write command a controller central processor, such as the central processing unit discussed in regards to FIGS. 4A and 4B implementing the present method issues a status message such as indicating complete transfer 514.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc.

It is believed that the system and method for providing transparent switched fabric data storage transport of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for transparent switched fabric data storage transport, comprising:

an input/output module for being coupled to a host device for translation of transported data and translating transported data according to common data communication protocol, the input/output module including:

a link core for implementing the common data communication protocol, the link core including transaction logic to allow for translation, said transition logic is capable of switching between at least two link cores implementing differing communication protocols;
a switch suitable for propagating data, the switch being individually coupled to the input/output module; and
a storage element capable of providing data storage, the storage element being coupled to the switch, the storage element including;
a controller coupled to the switch and being coupled to a plurality of storage devices for translation of transported data;
wherein the system employs the common data communication protocol to provide transparent mapped data storage transport.

2. The system for transparent switched fabric data storage transport of claim 1, wherein the input/output module further comprises:
a module memory suitable for utilization in data storage message transport, coupled to the link core;
a processor suitable for data handling, coupled to the module memory and the link core;
wherein the module is capable of translating between at least two communication protocols.

3. The system for transparent switched fabric data storage transport of claim 2, wherein the input/output module further comprises:
routing function software included in at least one of the processor and the memory, the routing function software is capable of instructing the processor to rout data;
wherein the module is suitable for communicating between at least three communication protocols.

4. The system of claim 2, wherein the input/output module circuit is an application specific integrated circuit.

5. The system of claim 2, wherein translation is based on at least one of host world wide name, a unique host identifier and logical unit number.

6. The system of claim 2, wherein the controller further comprises:
a controller circuit, including
a link core capable of implementing communication with the switch; and
a controller circuit memory suitable for data storage; coupled to the link core; and
wherein the controller circuit and the input/output module implement common message passing transport.

7. The system of claim 6, wherein a link core is compliant with at least one of Gigabit Ethernet, Fibre Channel, Peripheral Component Interconnect Express, InfiniBand and Peripheral Component Interconnect-X.

8. The system of claim 6, wherein the controller circuit is an application specific integrated circuit.

9. The system of claim 1, wherein the at least two switches are suitable for utilization at least minimally in conformance with InfiniBand.

10. The system of claim 1, wherein data transport utilizes heterogeneous communication protocols.

11. The system of claim 1, wherein the input/output module is capable of masking the system to external devices.

12. A controller for a multi-protocol data storage network, comprising:
a first circuit, including
at least one link core capable of implementing communication; and
a circuit memory suitable for data storage coupled to the at least one link core; and
a second circuit capable of controlling a plurality of storage devices;
an interconnect coupled to the first circuit and the second circuit, the interconnect being suitable for interfacing with the second circuit;
a processing unit capable of controlling the second circuit; and
a controller memory suitable for storing data, coupled to the processing unit and the interconnect;
wherein the first circuit includes transaction logic and is capable of receiving translated common message passing data transports and implementing communication according to a common data transfer protocol.

13. The controller of claim 12, wherein the controller interconnect is compliant with at least one of Third Generation Interconnect and Peripheral Component Interconnect.

14. The controller of claim 12, wherein translation is based on host world wide name.

15. The controller of claim 12, wherein translation is based on a unique host identifier.

16. The controller of claim 12, wherein translation is based on logical unit number.

17. The controller of claim 12, wherein the circuit is an application specific integrated circuit.

18. An input/output module for transparent switched fabric data storage transport, comprising:
a first circuit for being coupled to a host device; the first circuit being suitable for high capacity data transport;
a second circuit including:
a link core capable of implementing communication with the first circuit, the link core including transaction logic;
a memory suitable for utilization in data storage message transport; coupled to the link core;
a processor suitable for data handling, coupled to the memory and the link core;
wherein the second circuit is capable of translating between at least two communication protocols according to a common data communication protocol.

19. The input/output module, of claim 18, wherein the input/output module is suitable for utilization translating at least one of the following protocols InfiniBand, Gigabit Ethernet, Fibre Channel, Third Generation Interconnect, Peripheral Component Interconnect and Small Computer System Interface over Transmission Control Protocol/Internet Protocol.

20. The input/output module of claim 18, wherein translation is based on host world wide name.

21. The input/output module of claim 18, wherein translation is based on unique host identifier.

22. The input/output module of claim 18, wherein translation is based on logical unit number.

23. The input/output module of claim 18, wherein the second circuit is an application specific integrated circuit.

24. A circuit for switched fabric data storage transfer, comprising:
means for communicating capable of data storage transport in a heterogeneous communication protocol environment, the means for communicating including transaction logic;
a memory suitable for utilization in data storage transport, coupled to the communication means;
a processor suitable for multi-communication protocol data handling, coupled to the memory and the communication means;
wherein the circuit is capable of translating between at least two communication protocols according to a common data communication protocol.

25. The circuit of claim 24, wherein the communication means is compliant with at least one of Gigabit Ethernet, Fibre Channel, Peripheral Component Interconnect Express, InfiniBand and Peripheral Component Interconnect-X.

26. The circuit of claim 24, wherein translation is based on at least one of host world wide name, a unique host identifier and logical unit number.

27. The circuit of claim 24, wherein the circuit is an application specific integrated circuit.

28. A circuit for switched fabric data storage transfer, comprising:
   means for communicating storage data in a heterogeneous communication protocol environment, the means for communicating storage data including transaction logic;
   means for storing data suitable for utilization in data storage transport, coupled to the communication means;
   a processor suitable for multi-communication protocol data handling, coupled to the data storing means and the at least two communication means;
   wherein the circuit is capable of translating between at least two communication protocols according to a common data communication protocol.

29. The circuit of claim 28, wherein the communication means is compliant with at least one of Gigabit Ethernet, Fibre Channel, Peripheral Component Interconnect Express, InfiniBand and Peripheral Component Interconnect-X.

30. The circuit of claim 28, wherein translation is based on at least one of host world wide name, a unique host identifier and logical unit number.

31. The circuit of claim 28, wherein the circuit is an application specific integrated circuit.

32. A method for providing common message passing data transport, comprising:
   receiving host commands and data for access to a storage complex;
   posting received host commands and data to a buffer for processor access;
   interrupting a module processor with the received host commands;
   interpreting the received host commands and data by the module processor, wherein interpreting includes translating the received data into common communication protocol by transaction logic;
   transferring translated data within the storage complex;
   issuing a status message upon completion of an operation;
   wherein translating into common communication protocols is based on at least one of host world wide name, a unique host identifier and logical unit number.

* * * * *